United States Patent Office 3,700,491
Patented Oct. 24, 1972

3,700,491
COATED SYNTHETIC ORGANIC POLYMER FIBER
Karl Altau, Waynesboro, Va., assignor to E. I. du Pont de Nemours and Company, Wilmington, Del.
No Drawing. Filed Apr. 8, 1970, Ser. No. 26,771
Int. Cl. D06m 15/00
U.S. Cl. 117—138.8 UA
7 Claims

ABSTRACT OF THE DISCLOSURE

A polyoxypropylene glycol polyepoxide of the formula

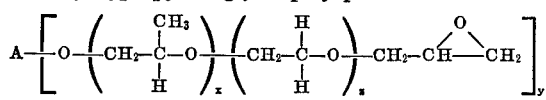

wherein A is an alkylene radical having a valence of Y and may contain at least one hydroxyl substituent, X is an integer from 4 to 60, inclusive, Z is an integer from 0 to 40, inclusive, Y is an integer of at least 2, and the ratio of X to Z is greater than about 3 to 2 and a composition comprising at least one polyepoxide of the above formula and at least one other polyepoxide formed as a reaction product of epichlorhydrin and a polyhydroxy compound containing at least three hydroxyl groups are prepared. They are suitable for minimizing the accumulation of charge of static electricity on a synthetic shaped structure. They also cause the shaped structure to attract fluorescent whitening agents from detergent solutions, are fast to bleaching, and do not cause staining during dry cleaning.

---

This invention is concerned with the treatment of shaped structures, e.g., fibers, to render them resistant to the buildup of static charges. It is particularly concerned with a treatment of shaped structures to impart to them antistatic properties which are not affected by washing, bleaching, or dry cleaning. It is still further concerned with a treatment of shape structures which will cause the shaped structures to attract to themselves fluorescent whitening agents from detergent solutions, without being stained in dry-cleaning.

BACKGROUND OF THE INVENTION

Synthetic fibers, such as polyamides, polyesters, polyolefins, and acrylics are normally highly hydrophobic; and garments made from these fibers tend to develop and hold charges of static electricity. Consequently, the garments cling to the body or to other objects and also attract lint. In the textile trade it is considered highly important that this property of the synthetic fibers be corrected.

The development of static electricity can be prevented by maintaining a high humidity. Fibers may also be treated with water-soluble, hydroscopic materials to give them a conductive surface. Glycerine, alkanol amines and highly soluble metal salts can be used for this purpose. However, all of these are easily removed by washing or rinsing, and the antistatic effect is lost.

Some success has been realized in numerous efforts to develop wash-durable antistatic finishes. Thus, Anthes in U.S. Pat. 2,982,751 discloses the use of polyethylene glycol amines and polyepoxides to obtain durable antistatic finishes. U.S. Pat. 3,021,232 to Pretka showed an improvement over Anthes by using a catalyst to speed up the reaction between the amine and the epoxide. Wilkinson in his U.S. Pat. 3,366,507, makes use of an acrylic ester of an alkyl phenol ether of polyoxyethylene glycol and copolymerizes the acrylic ester with glycidyl methacrylate to obtain a composition which will further polymerize on the fiber through the epoxide groups. The latter finish has good durability to washing, but it does not attract optical brighteners from detergent solutions. Also, finishes based on polyoxyethylene glycol cause staining in normal dry-cleaning operations, and garments made from treated fibers become discolored and harsh when dry cleaned.

U.S. Pat. 3,376,245 to Sample et al. shows the use of polyamines with polyepoxides with phosphoric acids as catalysts. However, it has been found that amine-containing finishes are not fast to bleaching because of the attack on the —NH linkage by the bleach.

SUMMARY OF THE INVENTION

This invention provides a polyoxypropylene glycol polyepoxide of the formula

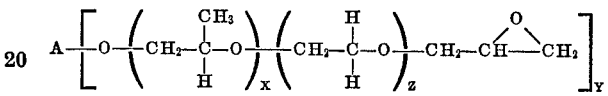

wherein A is an alkylene radical having a valence of Y and may contain at least one hydroxyl substituent, X is an integer from 4 to 60, inclusive, Z is an integer from 0 to 40, inclusive, Y is an integer of at least 2, and the ratio of X to Z is greater than about 3 to 2.

This invention also provides an antistatic composition comprising a mixture of at least one polyoxypropylene glycol polyepoxide, having the above described significance, and at least one other polyepoxide formed as a reaction product of epichlorhydrin and a polyhydroxy compound containing at least three hydroxyl groups.

This invention further provides a shaped structure (e.g., a fiber) having a coating of at least one of the polyoxypropylene glycol polyepoxides of the above recited formula, alone or in combination with at least one other polyepoxide which forms the antistatic composition mentioned above.

DESCRIPTION OF PREFERRED EMBODIMENTS

The polyoxypropylene glycol polyepoxides of this invention are made by the following reactions:

(I) A di- or polyhydroxy compound, preferably aliphatic, is reacted with 1,2-propylene oxide to form a di- or polyoxypropylene glycol derivative:

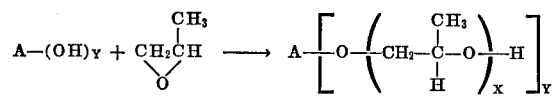

wherein A, X and Y have the significance hereinbefore defined.

(II) This polyoxypropylene glycol derivative can next be reacted with ethylene oxide to form a more complex polyoxypropylene glycol derivative:

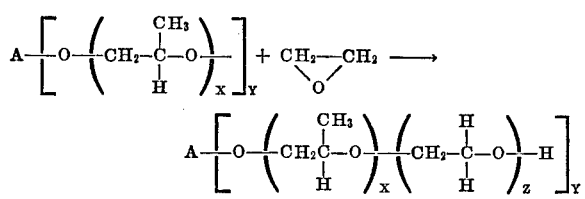

wherein A, X, Y and Z have the significance hereinbefore defined.

(III) The polyoxypropylene glycol or either reaction I or reaction II can then be reacted with epichlorhydrin to give the corresponding epoxide:

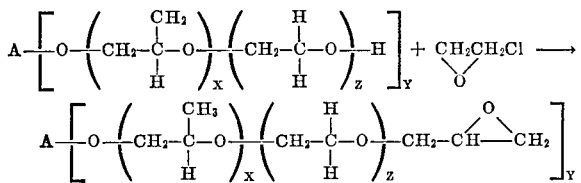

wherein A, X, Y and Z have the significance hereinbefore defined.

$(OH)_Y$ as used in this invention, can be a simple glycol such as

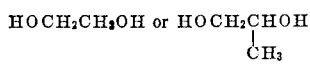

or it can be a more complicated polyhydroxy compound such a trimethylolpropane, sorbitol, mannitol, or polyvinyl alcohol. Accordingly, the term alkylene radical, as used in this invention to describe the radical A, having a valence of Y, includes simple alkylene radicals having a valence Y of 2, such as the ethylene radical, and complex alkylene radicals having a valence Y of 3 or more, such as the propane-1,2,3-tris-methylene radical. Also as used in this invention, these radicals are essentially hydrocarbon, but may contain one or more suitable substituents (e.g., hydroxyl).

When the ratio of X to Z is less than about 3 to 2, a shaped structure containing the finish of this invention will show signs of staining after three commercial dry cleanings.

One surprising part of this invention is the discovery that polyoxypropylene glycol derivatives behave entirely differently than polyoxyethylene glycol derivatives. Thus, a polyoxyethylene glycol diepoxide, made by reacting a polyoxyethylene glycol with epichlorydrin, when crosslinked on the fiber with a polyepoxide (such as "Eponite" 100 of Shell Chemical Co.), will give a wash-fast antistatic finish, but the treated fiber will stain during drycleaning. A similar finish prepared from polyoxypropylene glycol diepoxide and the same polyepoxide is not stained during dry-cleaning.

In the preferred product, A is an ethylene radical, Y is 2, X is 12, and Z is 6.

This preferred product as well as other products in which Y is 2 is not satisfactory by itself for brightener exhaustion but must be used with a second polyepoxide. This second polyepoxide is a reaction product of epichlorhydrin and a polyhydroxy compound containing at least three hydroxyl groups. Preferred polyhydroxy compounds are glycerine and pentaerythritol.

The preferred polyepoxide to be used with the polyoxypropylene glycol diepoxide is the polyepoxide (available commercially as "Eponite" 100, sold by the Shell Chemical Co.) made by reacting glycerine with an excess of epichlorhydrin. This polyepoxide is a mixture of compounds containing about 2.2 epoxy groups per molecule. One of the simple compounds present in this mixture is shown below as a representative compound having the formula:

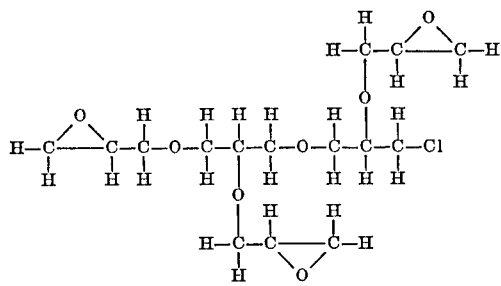

With these preferred polyepoxides, the ratio of the first polyepoxide to the second polyepoxide is from 95/5 to 5/95.

When Y is at least 3, it is not required that the polyoxypropylene glycol polyepoxide be mixed with another polyepoxide in order to obtain a bleach-fast, wash-fast, dry cleaning-fast, antistatic finish. These self-acting polyepoxides, however, may not have sufficient hydroxyl groups to give a high enough degree of exhaustion of brighteners for some end use. Therefore it is preferred to mix this polyepoxide with a second polyepoxide, e.g. "Eponite" 100, in order to obtain a better exhaustion of brighteners.

The polyoxypropylene glycol polyepoxides of this invention or the mixture of polyoxypropylene glycol polyepoxides and a second polyepoxide can be dissolved in a suitable solvent, e.g., acetone, and applied to the shaped structure. The shaped structure is then heated to bring about reaction of the epoxide groups to form a high polymer on the surface of the fiber.

Instead of dissolving the polyepoxide or polyepoxide mixture in acetone or other solvent, it can be dispersed in water for application to the fibers. Water is preferred as a medium over acetone because it is more economical and safer.

Although water is a suitable medium for applying the polyoxypropylene glycol polyepoxides of this invention when there are no ethylene oxide units

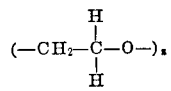

present, i.e., when Z is 0, it is a more effective medium when ethylene oxide units are present since these units increase the solubility of the polyoxypropylene glycol polyepoxide in water.

The use of ethylene oxide for chain extending the polyoxypropylene glycol also improves the antistatic effect, especially if the molecular weight of the polyoxypropylene glycol polyepoxide is over 1000. At molecular weights under 1000, ethylene oxide units contribute little to antistatic effects.

It is preferred to use a catalyst to accelerate the epoxide condensation reaction on the fiber. Tertiary amines, especially those of low volatility, are suitable as catalysts. Examples of catalysts are 2,4,6-tris(dimethylaminomethyl)-phenol, 2,4,6-tri(dimethylaminomethyl)-phenol acetate, or other salts of this amine, N-methylimino-bispropyl amine, and triethanol amine. Other tertiary amines or their salts with a weak acid can be used.

The concentration of agent on the fiber to give satisfactory antistatic effect will vary somewhat from fiber to fiber, e.g., polyester fibers requiring less than acrylic fibers. Usually a concentration of 0.1 to 5.0% by weight is satisfactory. For most applications 0.1 to 2.0% is adequate.

Treated fibers will exhaust optical brighteners from detergent solutions used in scouring fabrics. Undyed fabrics will therefore appear whiter in natural light than fabrics from fibers not treated according to this invention. The antistatic finish of this invention will pick up optical brighteners of the cotton type, present in most commercially avilable detergents used for fabrics, because the epoxide cross-linking reaction generates free hydroxyl groups. This finish is also stable to oxidizing bleaches such as sodium chlorite and hypochlorite.

MEASUREMENTS

The static propensity of the fabric is determined by measuring the static charge decay rate using the Vykand Static Propensity Tester manufactured by the Vykand Corporation. In this equipment the fabric is used to form one plate of a capacitor and the static detector is used as the other plate. A negative charge of 5000 volts is placed upon the fabric, then the sample is grounded and the time required for leakage to 2500 volts is measured.

This is referred to as the half-life of the static charge. Measurements are made at 30% relative humidity.

A half-life of 90 seconds is considered just barely satisfactory.

Optical brightener pick-up for fabrics is measured by a Hunter Laboratory D-40 Reflectometer. The difference in measured whiteness, $\Delta W$, observed with and without ultraviolet contribution is due to ultraviolet-induced fluorescence and can be taken as a measure of brightener pick-up. $W_{inc}$ is the reflectance value with ultraviolet contribution. $W_{exc}$ is the reflectance value without ultraviolet contribution.

The following examples will illustrate the invention. All parts and percentages are expressed on a weight basis unless otherwise indicated.

Example I

Ethylene glycol is reacted with 1,2-propylene oxide to yield a glycol having a molecular weight of about 1000. This requires about 16 mols of propylene oxide per mol of ethylene glycol. The resulting product has approximately the following composition.

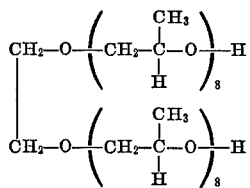

This polyoxypropylene glycol is then reacted with two mols of epichlorhydrin to form the bis glycidyl ether.

Four grams of this glycidyl ether are dissolved in 520 grams of acetone containing 8 grams of dimethylformamide and 4 grams of a polyepoxide derived from glycerine and an excess of epichlorohydrin ("Eponite" 100) are added along with 0.64 gram of 2,4,6-tris(dimethylaminomethyl)-phenol.

A fabric made from fibers spun from a terpolymer of 94% acrylonitrile, 5.6% methyl acrylate and 0.4% sodium styrenesulfonate is dipped into the above acetone solution, then the excess solution squeezed out to leave a wet pickup of 125%. The acetone is allowed to evaporate at room temperature, then the fabric is heated for 15 minutes at 130° C. The net gain in weight of the fabric as a result of the treatment is 2%.

The static propensity is measured on the fabric as treated, after one laundering at 40° C. followed by tumble drying at 70° C., after bleaching with sodium chlorite, and after 5, 12 and 14 additional launderings. The half-life times in seconds are shown in Table I.

Example II

In this example the polyoxypropylene glycol is end-capped by reacting with ethylene oxide to improve water dispersibility and antistatic effect.

Ethylene glycol is first reacted with 12 mols propylene oxide then with 6 mols ethylene oxide. The resulting oxypropyleneoxyethylene glycol is then reacted with epichlorhydrin to form the diepoxide of the following approximate formula:

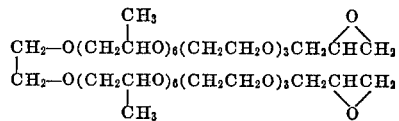

Four grams of this product, 4 grams of a polyepoxide derived from glycerine and an excess of epichlorhydrin ("Eponite" 100) and 0.64 gram of 2,4,6-tris(dimethylaminomethyl)-phenol are used to treat a fabric as in Example I. The results of static propensity tests before and after laundering and bleaching are shown in Table I. After three commercial dry cleanings the fabrics are not stained.

TABLE I.—STATIC PROPENSITY

| | As treated | After 1 wash | After bleach | After 5 washes | After 12 washes | After 14 washes |
|---|---|---|---|---|---|---|
| Ex. I | 1 | 6 | (1) | 8 | 18 | 77 |
|  | 1 | (2) | 44 | 30 | 34 | 74 |
| Ex. II | 1 | 3 | (1) | 6 | 6 | 20 |
|  | 1 | (2) | 16 | 10 | 12 | 42 |

[1] Not bleached.
[2] Not washed.

No staining is observed after three commercial dry cleanings.

Example III

The glycidyl ether of the polyoxypropylene from Example I and "Eponite" 100 are applied to a fabric made from fibers spun from a terpolymer of 94% acrylonitrile, 5.6% methyl acrylate and 0.4% sodium styrenesulfonate from acetone as described in Example I. Coating A is composed of 1.0% diglycidyl ether of the said polyoxypropylene and 0.6% "Eponite" 100; Coating B is composing of 1.0% diglycidyl ether of polyoxypropylene and 0.8% "Eponite" 100; Coating C is composed of 1.0% diglycidyl ether of polyoxypropylene and 1.0% "Eponite" 100.

These treated fabrics, after heating for 15 minutes at 130° C., are subjected to sodium chlorite bleach. Also, a fabric without surface treatment is included. After bleaching, the fabrics are laundered 10 times as described in Example I. Optical brightener pick-up is illustrated as follows (Table II):

TABLE II.—OPTICAL BRIGHTENER PICK-UP AS MEASURED BY W

[Whiteness values after bleaching and 10 launderings]

| Fabric | $W_{exc}$ | $W_{inc}$ | $\Delta W$ |
|---|---|---|---|
| A | 74.6 | 85.1 | 10.5 |
| B | 71.1 | 88.1 | 17.0 |
| C | 70.9 | 90.0 | 19.1 |
| D | 82.2 | 83.1 | 0.9 |

When these fabrics A, B and C are examined outdoors in daylight, they appear visibly whiter than the untreated control fabric D.

Example IV

In this example ethylene glycol is first reacted with 12 mols propylene oxide and then with 8 mols ethylene oxide. The resulting oxypropylene-oxyethylene glycol is then reacted with epichlorhydrin to form the diepoxide of the following formula:

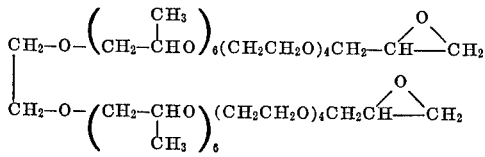

Two grams of this product, one gram of "Eponite" 100 and 0.24 gram of 2,4,6-tris(dimethylaminomethyl)-phenol are used to treat a fabric as in Example I. After three commercial dry cleanings the fabric showed signs of staining indicating that more than about 40% ethylene oxide modification is not desirable.

Example V

The following example illustrates the application from aqueous medium:

Two grams of the diepoxide from Example II is dissolved along with 2 grams of "Eponite" 100 in 4 grams of dimethyl formamide. This solution is added to a Waring Blendor® containing 260 grams water in which 0.32 gram 2,4,6-tris(dimethylaminoethyl)-phenol is dissolved. After a brief shearing in the Waring Blendor® a dispersion is obtained. This is divided into two equal parts, A and B. Portion A has a pH of 10.6. A fabric described in Example 1 is dipped into the above dispersion then the excess dispersion is squeezed out to leave a wet pick-up of 125%. Fabric is then heated for 15 minutes at 130° C.

Part B of the dispersion is acidified with dilute hydrochloric acid and to pH 5.3. Another piece of fabric as described in Example I is dipped into the acidified dispersion and treated as was done for Part A.

The static decay of the fabrics is measured after 12 launderings. The half-life times in seconds are as follows (Table III):

TABLE III.—STATIC PROPENSITY

| | Half-life in seconds |
|---|---|
| Fabric from Part A | 26 |
| Fabric from Part B | 19 |

Acids such as phosphoric, acetic, sulfuric, etc., serve as well as hydrochloric for acidifying the application bath.

Another set of similar fabrics which are treated as Parts A and B is subjected to sodium chlorite bleach followed by 11 launderings with "Tide" detergent. These fabrics are then measured in the Hunter Laboratory D-40 Reflectometer for brightener pick-up. Also included is an untreated control fabric C which also is subjected to sodium chlorite bleach and 11 launderings with "Tide." The following Table IV shows the brightener pick-up of the fabric:

TABLE IV.—OPTICAL BRIGHTENER PICK-UP AS MEASURED BY W

[Whiteness values after bleaching and 11 launderings]

| Fabric | $W_{exc}$ | $W_{inc}$ | $\Delta W$ |
|---|---|---|---|
| A | 66.6 | 83.7 | 17.1 |
| B | 81.5 | 92.1 | 10.6 |
| C | 88.8 | 90.1 | 1.3 |

Fabrics A and B are visibly whiter in daylight than the control Fabric C.

What is claimed is:

1. A fiber of a synthetic organic polymer having a coating of from about 0.1 to about 5.0% by weight of the fiber of at least one polyoxypropylene glycol polyepoxide of the formula

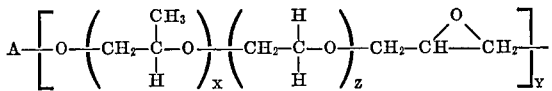

wherein A is an alkylene radical having a valence of Y and may contain at least one hydroxyl substituent, X is an integer of from 4 to 60, inclusive, Z is an integer of from 0 to 40, inclusive, Y is an integer of at least 2, and the ratio of X to Z is greater than bout 3 to 2.

2. The fiber of claim 1 wherein said fiber is an acrylic fiber.

3. The fiber of claim 2 wherein A is an ethylene radical, Y is 2, X is an integer between 6 and 8 inclusive, Z is an integer between 0 and 4 inclusive, and the ratio of X to Z is greater than 3 to 2.

4. The fiber of claim 1 in which the coating contains, additionally, the reaction product of epichlorohydrin and a polyhydroxy compound containing at least three hydroxyl groups, in an amount of between 5 and 95% by weight based on the weight of the polyoxypropylene glycol polyepoxide.

5. The fiber of claim 4 wherein said fiber is an acrylic fiber.

6. The fiber of claim 5 wherein A is an ethylene radical, Y is 2, X is an integer between 6 and 8 inclusive, Z is an integer between 0 and 4 inclusive, and the ratio of X to Z is greater than 3 to 2.

7. The fiber of claim 6 whereiin the polyhydroxy compound containing at least three hydroxyl groups is glycerine.

References Cited

UNITED STATES PATENTS

| 2,872,432 | 2/1959 | Metzger | 260—836 |
| 3,376,245 | 4/1968 | Sample et al. | 117—138.8 UA X |
| 2,982,751 | 5/1961 | Anthes | 117—161 ZB X |
| 3,129,273 | 4/1964 | Lowes | 117—138.8 UA X |
| 3,351,622 | 11/1967 | Tesoro | 117—139.5 A X |
| 3,399,079 | 8/1968 | Harris et al. | 117—138.8 UA |
| 3,515,698 | 6/1970 | Mauz et al. | 117—139.5 A X |
| 3,154,429 | 10/1964 | Albrecht et al. | 117—139.5 A |
| 3,470,110 | 9/1969 | Renner | 117—161 ZB X |

RALPH HUSACK, Primary Examiner

U.S. Cl. X.R.

8—115.6; 117—138.8 N, E, F, 139.5 CQ, A, 161 ZB; 252—8.9; 260—348 R, 830 TW